United States Patent
Wu et al.

(10) Patent No.: US 8,824,082 B2
(45) Date of Patent: Sep. 2, 2014

(54) HARD DISK DRIVE

(71) Applicants: Kang Wu, Shenzhen (CN); Bo Tian, Shenzhen (CN)

(72) Inventors: Kang Wu, Shenzhen (CN); Bo Tian, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 102 days.

(21) Appl. No.: 13/647,450

(22) Filed: Oct. 9, 2012

(65) Prior Publication Data

US 2013/0170066 A1 Jul. 4, 2013

(30) Foreign Application Priority Data

Dec. 30, 2011 (CN) .......................... 2011 1 0453243

(51) Int. Cl.
 *G11B 19/04* (2006.01)
(52) U.S. Cl.
 USPC ............................................. 360/55; 360/69
(58) Field of Classification Search
 None
 See application file for complete search history.

(56) References Cited

U.S. PATENT DOCUMENTS

| | | | |
|---|---|---|---|
| 4,737,867 A * | 4/1988 | Ishikawa et al. | 360/69 |
| 6,295,609 B1 * | 9/2001 | Cargemel et al. | 714/6.23 |
| 6,304,976 B1 * | 10/2001 | Kim | 713/300 |
| 6,314,523 B1 * | 11/2001 | Voltz | 360/75 |
| 6,691,248 B1 * | 2/2004 | Nishijima et al. | 714/14 |
| 6,885,115 B2 * | 4/2005 | Hatori et al. | 307/80 |
| 7,577,871 B2 * | 8/2009 | Largman et al. | 714/20 |
| 7,636,218 B2 * | 12/2009 | Takeda et al. | 360/60 |
| 7,859,132 B2 * | 12/2010 | Chung et al. | 307/39 |
| 8,572,422 B2 * | 10/2013 | Fukuyama | 713/324 |
| 2014/0016237 A1 * | 1/2014 | Wright et al. | 361/88 |

* cited by examiner

*Primary Examiner* — Wayne Young
*Assistant Examiner* — James L Habermehl
(74) *Attorney, Agent, or Firm* — Novak Druce Connolly Bove + Quigg LLP

(57) ABSTRACT

A hard disk drive includes a control unit, a cache unit, a head unit, a platter unit, a spindle motor unit, a power supply unit, a switch unit, and an interface. When the switch unit is turned on, the power supply unit converts voltages of external power supplies received from the interface through the switch unit into operation voltages of the control unit, the cache unit, the head unit, the platter unit, and the spindle motor unit, and supplies the operation voltages to the control unit, the cache unit, the head unit, the platter unit, and the spindle motor unit. When the switch unit is turned off by the control unit, the voltages of the external power supplies cannot be transmitted to the power supply unit through the switch unit.

5 Claims, 2 Drawing Sheets

HARD DISK DRIVE

BACKGROUND

1. Technical Field

The present disclosure relates to a hard disk drive (HDD).

2. Description of Related Art

Many HDDs are assembled in a computer system for adding storage capacity. If one of the HDDs is damaged, the damaged HDD is still powered, which wastes energy.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references can mean "at least one".

Figure 1:
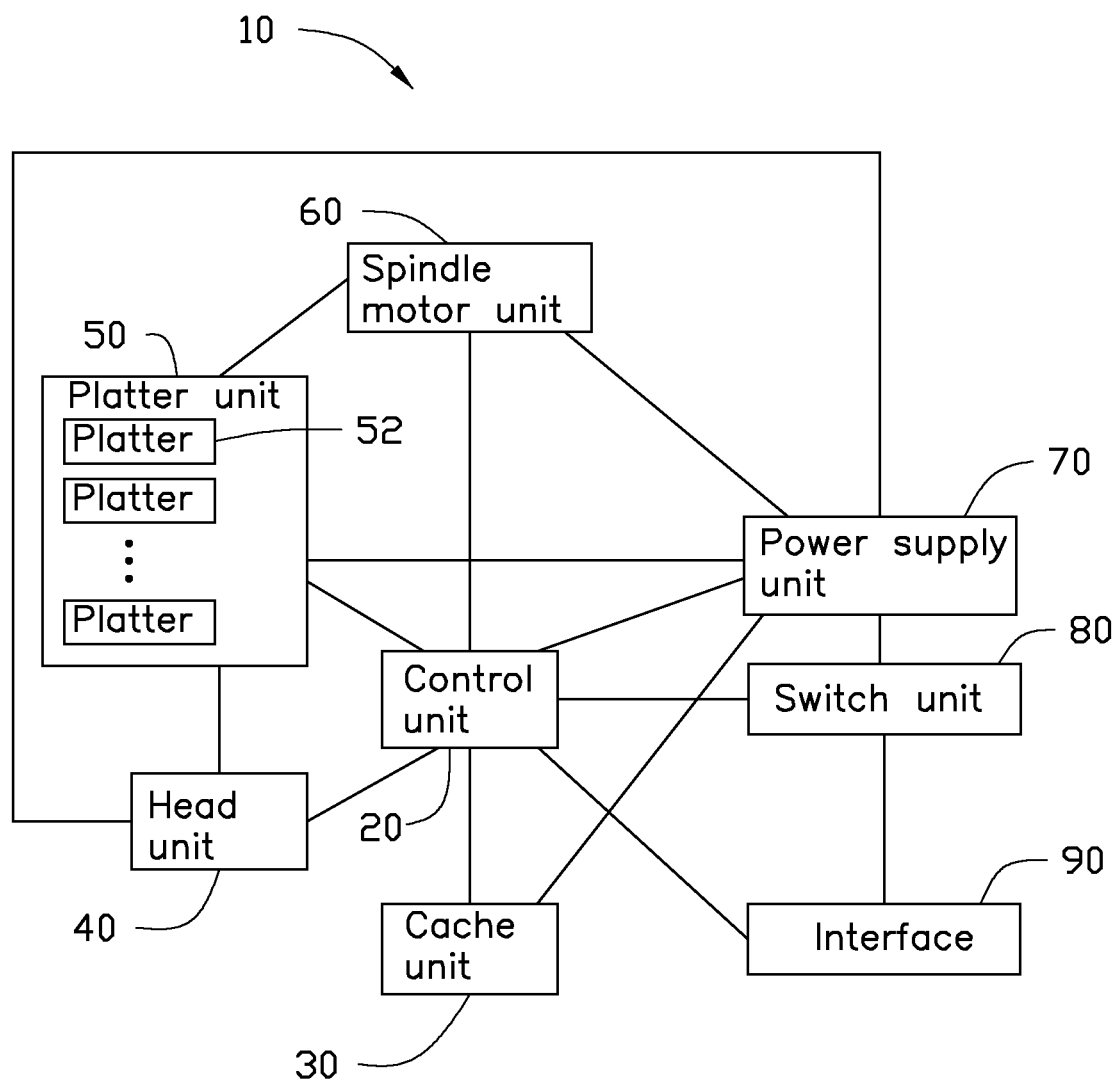
FIG. 1 is a block diagram of a hard disk drive (HDD) in accordance with an embodiment of the present disclosure.

Referring to FIG. 1, an embodiment of a hard disk drive (HDD) 10 is shown. The HDD 10 includes a control unit 20, a cache unit 30, a head unit 40, a platter unit 50, a spindle motor unit 60, a power supply unit 70, a switch unit 80, and an interface 90. The control unit 20 is connected to the cache unit 30, the head unit 40, the platter unit 50, the spindle motor unit 60, the switch unit 80, and the interface 90. The power supply unit 70 is connected to the control unit 20, the cache unit 30, the head unit 40, the platter unit 50, and the spindle motor unit 60. The switch unit 80 is connected between the power supply unit 70 and the interface 90.

The control unit 20 controls the cache unit 30 to cooperate with the head unit 40, the platter unit 50, and the spindle motor unit 60, to achieve reading and writing functions of the HDD 10. The control unit 20 also detects operation states of the cache unit 30, the head unit 40, the platter unit 50, and the spindle motor unit 60. The control unit 20 further outputs a control signal to the switch unit 80 when detecting at least one of the cache unit 30, the head unit 40, the platter unit 50, and the spindle motor unit 60 is damaged, and also outputs the control signal to the switch unit 80 when the control unit 20 is damaged. The cache unit 30 is used to cache data. The head unit 40 is connected to the platter unit 50, to write data into the platter unit 50, and read data from the platter unit 50. The platter unit 50 includes a plurality of platters 52 used to store data. The spindle motor unit 60 is connected to the platter unit 50, to drive the platters 52 of the platter unit 50 to rotate. The power supply unit 70 is used to convert voltages of external power supplies received from the interface 90 through the switch unit 80 into operation voltages of the control unit 20, the cache unit 30, the head unit 40, the platter unit 50, and the spindle motor unit 60, and respectively supply the operation voltages to the control unit 20, the cache unit 30, the head unit 40, the platter unit 50, and the spindle motor unit 60. The switch unit 80 is used to stop transmitting the voltages of the external power supplies output from the interface 90 to the power supply unit 70, after receiving the control signal. The control unit 20, the cache unit 30, the head unit 40, the platter unit 50, the spindle motor unit 60, the power supply unit 70, and the interface 90 fall within well-known technologies, and are therefore not described here.

Figure 2:
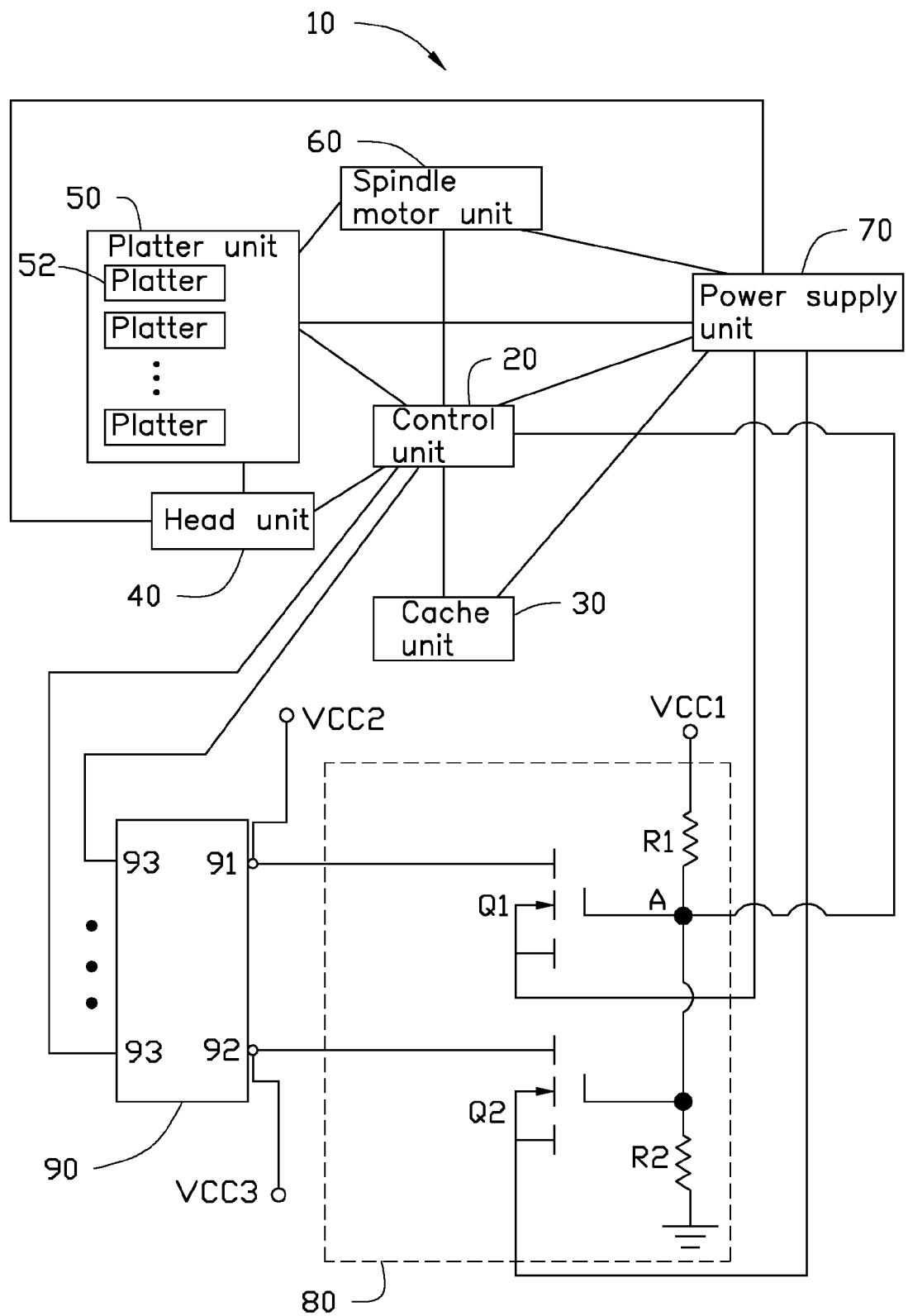
FIG. 2 is a circuit diagram of the HDD of FIG. 1.

Referring to FIG. 2, the switch unit 80 includes a first electronic switch Q1, a second electronic switch Q2, and two resistors R1 and R2. The interface 90 includes two power pins 91 and 92, and a plurality of signal pins 93. The resistors R1 and R2 are connected in series between an internal power supply VCC1 and the ground. A control terminal of the first electronic switch Q1 is connected to the control unit 20 to receive the control signal, and connected to a node A between the resistors R1 and R2. A power terminal of the first electronic switch Q1 is connected to the power pin 91 of the interface 90. An output terminal of the first electronic switch Q1 is connected to the power supply unit 70. A control terminal of the second electronic switch Q2 is connected to the control terminal of the first electronic switch Q1. A power terminal of the second electronic switch Q2 is connected to the power pin 92 of the interface 90. An output terminal of the second electronic switch Q2 is connected to the power supply unit 70. The power pin 91 of the interface 90 is further connected to a first external power supply VCC2. The power pin 92 of the interface 90 is further connected to a second external power supply VCC3. The signal pins 93 are connected to the control unit 20 and a serial advanced technology attachment (SATA) interface of a motherboard (not shown), to enable the HDD 10 to communicate with the motherboard. In one embodiment, the internal power supply VCC1 is supplied by an internal battery of the HDD 10, the first external supply VCC2 is a 5 volt (V) power supply supplied by an external power supply, such as an advanced technology extended (ATX) power supply of a computer, and the second external power supply VCC3 is a 12V power supply supplied by the external power supply.

The voltage at the control terminals of the first and second electronic switches Q1 and Q2 is equal to the voltage at the node A between the resistors R1 and R2. The resistors R1 and R2 acts as a voltage divider to divide the voltage at the internal power supply VCC1. The resistors R1 and R2 are chosen such that, at startup of the HDD 10, the first and second electronic switches Q1 and Q2 are turned on. The voltage from the first external power supply VCC2 is transmitted to the power supply unit 70 through the power pin 91 of the interface 90 and first electronic switch Q1. The voltage from the second external power supply VCC3 is transmitted to the power supply unit 70 through the power pin 92 of the interface 90 and the second electronic switch Q2. The power supply unit 70 converts the voltages of the first and second external power supplies VCC2 and VCC3 into operation voltages of the control unit 20, the cache unit 30, the head unit 40, the platter unit 50, and the spindle motor unit 60, and supplies the operation voltages to the control unit 20, the cache unit 30, the head unit 40, the platter unit 50, and the spindle motor unit 60.

When the control unit 20 detects at least one of the cache unit 30, the head unit 40, the platter unit 50, and the spindle motor unit 60 is damaged, the control unit 20 outputs the control signal to the control terminals of the first and second electronic switches Q1 and Q2. When the control unit 20 is damaged, the control unit 20 also outputs the control signal to the control terminals of the first and second electronic switches Q1 and Q2. The first and second electronic switches Q1 and Q2 are turned off. The voltages of the first and second external power supplies VCC2 and VCC3 cannot be transmitted to the power supply unit 70, and energy is saved.

In one embodiment, each of the first and second electronic switches Q1 and Q2 is an n-channel metal-oxide semiconductor field-effect transistor (NMOSFET). The control terminal, the power terminal, and the output terminal of each of the first and second electronic switches Q1 and Q2 are a gate, a drain, and a source of the NMOSFET. The control signal is a low level (logic 0) signal. In other embodiments, each of the first and second electronic switches Q1 and Q2 may be an npn bipolar junction transistor, or other switch having similar functions.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A hard disk drive (HDD), comprising:
   a platter unit comprising a plurality of platters to store data;
   a spindle motor unit connected to the platter unit, to drive the platters of the platter unit to rotate;
   a head unit connected to the platter unit, to write data into the platter unit and read data from the platter unit;
   a cache unit to cache data;
   an interface connected to external power supplies;
   a switch unit;
   a control unit connected to the platter unit, the spindle motor unit, the head unit, the cache unit, the interface, and the switch unit, wherein the control unit controls the cache unit to cooperate with the head unit, the platter unit, and the spindle motor unit, to achieve reading and writing functions of the HDD, and detects operation states of the cache unit, the head unit, the platter unit, and the spindle motor unit; and
   a power supply unit connected to the interface through the switch unit, and connected to the platter unit, the spindle motor unit, the head unit, the cache unit, and the control unit, wherein the power supply unit converts the voltages of the external power supplies received from the interface into operation voltages of the control unit, the cache unit, the head unit, the platter unit, and the spindle motor unit, and supplies the operation voltages to the control unit, the cache unit, the head unit, the platter unit, and the spindle motor unit, in response to the switch unit being turned on;
   wherein the control unit outputs a control signal to turn off the switch unit, in response to the control unit detecting that at least one of the cache unit, the head unit, the platter unit, and the spindle motor unit is damaged;
   wherein the control unit outputs the control signal to turn off the switch unit, in response to the control unit being damaged; and
   wherein the voltages of the external power supplies cannot be transmitted to the power supply unit in response to the switch unit being turned off.

2. The HDD of claim 1, wherein the interface comprises a first power pin connected to a first external power supply, and a second power pin connected to a second external power supply.

3. The HDD of claim 2, wherein the switch unit comprises:
   a first resistor and a second resistor connected in series between an internal power supply and the ground;
   a first electronic switch comprising:
      a control terminal connected to the control unit to receive the control signal, and connected to a node between the first resistor and the second resistor;
      a power terminal connected to the first power pin of the interface to receive the first external power supply; and
      an output terminal connected to the power supply unit; and
   a second electronic switch comprising:
      a control terminal connected to the control terminal of the first electronic switch;
      a power terminal connected to the second power pin of the interface to receive the second external power supply; and
      an output terminal connected to the power supply unit;
   wherein the first and second electronic switches are turned off in response to the control terminals of the first and second electronic switches receiving the control signal, the voltage of the first external power supply cannot be transmitted to the power supply unit through the first electronic switch, and the voltage of the second external power supply cannot be transmitted to the power supply unit through the second electronic switch; and
   wherein the first and second electronic switches are turned on by the voltage at the node between the first resistor and the second resistor, in response to the control terminals of the first and second electronic switches not receiving the control signal, the voltage of the first external power supply is transmitted to the power supply unit through the first electronic switch, and the voltage of the second external power supply is transmitted to the power supply unit through the second electronic switch.

4. The HDD of claim 3, wherein each of the first and second electronic switches is an n-channel metal-oxide semiconductor field-effect transistor (NMOSFET), the control terminal, the power terminal, and the output terminal of each of the first and second electronic switches are a gate, a drain, and a source of the NMOSFET.

5. The HDD of claim 4, wherein the control signal is a low level signal.

* * * * *